ILLUMINATION CONTROL SYSTEM FOR TELEVISION PICKUP TUBES AND THE LIKE
Filed Sept. 20, 1960 5 Sheets-Sheet 1

PHOTOCATHODE PULSER

INVENTORS
ROY A. KAMPMEYER
ROBERT A. LEE
BAYARD F. WALKER
BY K. G. Doub
ATTORNEY INVENTORS
ROY A. KAMPMEYER
ROBERT A. LEE
BAYARD F. WALKER
BY K. G. Doub
ATTORNEY INVENTORS
ROY A. KAMPMEYER
ROBERT A. LEE
BAYARD F. WALKER
BY K.G. Doub
ATTORNEY

INVENTORS
ROY A. KAMPMEYER
ROBERT A. LEE
BAYARD F. WALKER

BY K. G. Doub
ATTORNEY

INVENTORS
ROY A. KAMPMEYER
ROBERT A. LEE
BAYARD F. WALKER
BY K. G. Doub
ATTORNEY United States Patent Office
3,182,125
Patented May 4, 1965

3,182,125

ILLUMINATION CONTROL SYSTEM FOR TELEVISION PICKUP TUBES AND THE LIKE

Roy A. Kampmeyer, Robert A. Lee, and Bayard F. Walker, Baltimore County, Md., assignors to The Bendix Corporation, Towson, Md., a corporation of Delaware Filed Sept. 20, 1960, Ser. No. 57,292
22 Claims. (Cl. 178—7.92)

Television pickup or camera tubes, particularly when operating outdoors away from a light-conditioned studio, are called upon to transmit pictures of scenes varying widely in intensity of illumination; and this has resulted in the utilization of light control devises, such as the iris diaphragm which operates on the principle of light-aperture-variation, and the variable density filter which operates on the principle of light polarization. It has also been proposed to compensate for changes in illumination on the photocathode by controlling the magnitude of the output signal as a function of signal electrode potential. Each of these methods, when considered individually, fail to meet the requirements for the wide range of control necessary when the pickup or camera tube is called upon to scan scenes subjected to unusually bright illumination, as where the tube is mounted for orientation to look directly into the sun or other brightly illuminated object. Consider the well-known Image Orthicon tube for which the herein-disclosed compensation system is particularly adapted. Here the optical image is projected onto a photocathode, which emits electrons in proportion to the intensity of illumination. These electrons are accelerated to a so-called target, where an electron image is formed equivalent to the light image on the photocathode. At the target the electrons arrive with sufficient velocity to cause the emission of secondary electrons, which are collected by an adjacent target mesh, thereby leaving a net positive charge pattern on the target itself. This charge can only build up to the same value as the mesh potential, at which time saturation takes place and a further increase in illumination level results in a non-proportional target charge. The desired operating region for an Image Orthicon from an image-quality standpoint is near the saturation point, which in FIG. 1 is indicated as the "knee" of a curve plotting photocathode illumination in foot candles against signal output current in microamperes. If the pickup tube is operated below this point, noise will result, and if it is operated above this point without light control, the quality of the picture will be affected, and there are times when the scenic illumination becomes so intense as to damage the photocathode and/or target.

An object of the present invention is to provide a light or illumination control system for television pickup tubes, and particularly those which operate on the principle of the Image Orthicon, having a range of compensation wide enough to meet normal to extremely high light-level requirements.

Another object is to provide a light-control system for television pickup tubes having a source of control potential varying with variations in photocathode illumination and which at the same time is inherent in the tube itself and is taken off independently of the video signal output.

Another object is to provide an "electrical" method of light compensation. This is accomplished by varying the potential of the photocathode with variations in light level to thereby proportionally vary the charge on the target, such method being herein termed "photocathode pulsing." There may be instances when the required range of light control can be met by photocathode pulsing alone. However, in the herein-disclosed system it is coordinated with mechanical compensation to extend the range.

A further object is to provide a light-control system for television camera or pickup tubes in which an iris diaphragm, a constant density filter, and photocathode pulsing are coordinated to provide light control over a relatively wide range.

The foregoing and other objects and advantages will become apparent in the light of the following description taken in conjunction with the drawings, wherein.

Figure 2:
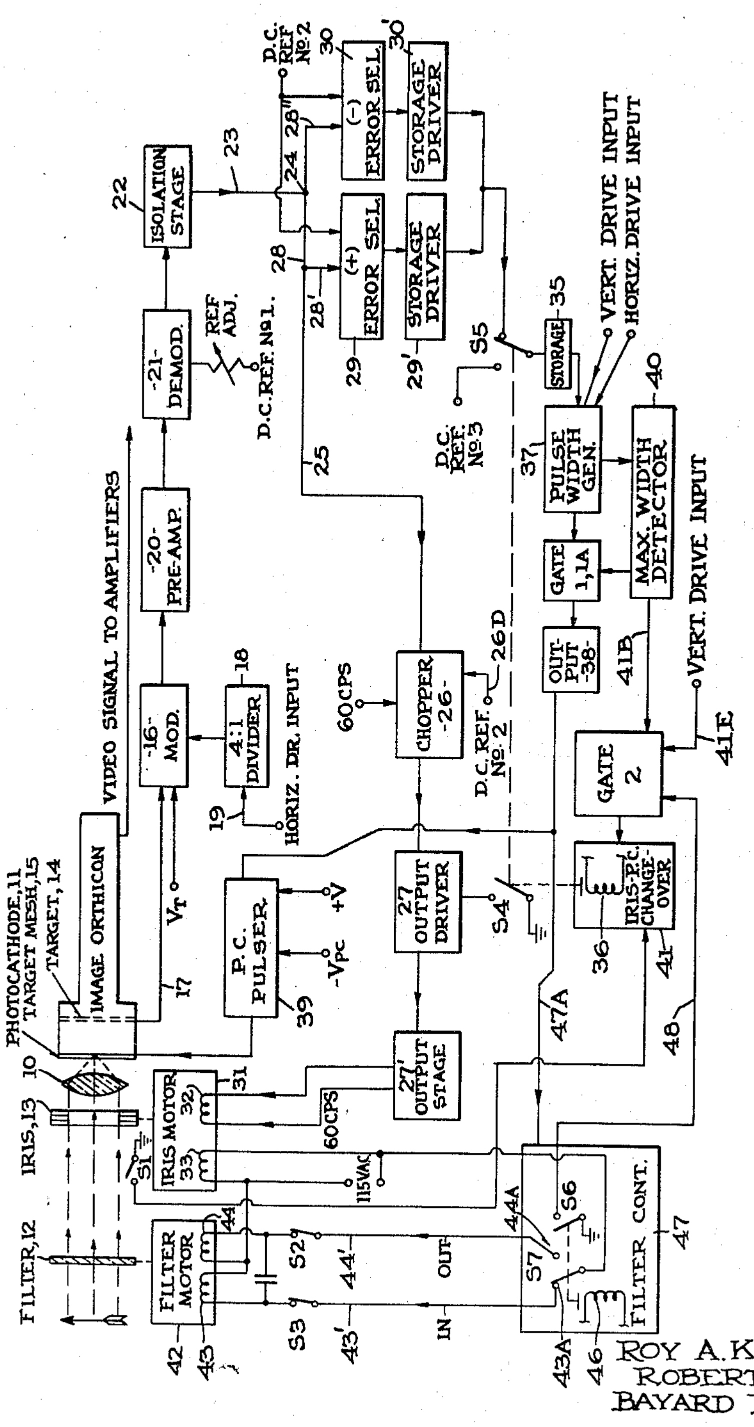
FIG. 2 is a combined schematic and block diagram of a light control system in accordance with the invention operatively associated with an Image Orthicon camera or pickup tube.

Referring to the drawings and first to FIG. 2, the optical image of the object to be televised is projected by way of a lens or optical system 10 onto the photocathode 11 of an Image Orthicon tube, which is represented schematically. A neutral density filter 12 and an iris diaphragm 13 are shown located between the optical system 10 and the object to be televised. As will be subsequently explained, however, the filter 12 is moved across the light path only under extreme high-lighted conditions. The iris diaphragm may be of any conventional type having an adjustable aperture. Motor-driven iris diaphragms are well known in the art and may be purchased in the open market. When an optical image is projected onto the photocathode 11, electrons in proportion to the intensity of illumination are emitted, and these are accelerated to a target 14, on which an electron image corresponding to that being televised is formed. Secondary electrons are collected on a target mesh 15, leaving a net positive charge on the target which is constantly being discharged by a scanning beam of the return beam type. The electron gun section for producing the scanning beam and the signal output section of the Image Orthicon are not shown in detail since such components are not involved in the operation of the subject light control apparatus. Briefly stated, when the target is scanned by the main or forward beam, those electrons which do not land constitute part of the return beam, and these strike the first dynode plate of a multiplier section, which produces an output signal proportional to the electrons landing on the target. The output signal is amplified and conducted to the receiver section of a picture tube for processing in the conventional manner.

The current flowing in the target mesh 15 is proportional to photocathode illumination, and this current is utilized as a source of potential for controlling the iris diaphragm 13 and the filter 12; also photocathode pulsing, to be described. To do this, a modulator 16 is provided and the target current is applied to this modulator by way of conductor 17. A carrier wave is generated by suitable means, not shown, and impressed on the modulator circuit by way of a pulse divider 18, driven from the horizontal drive circuit, also not shown, by way of conductor 19, and this carrier is modulated by the target mesh current. The modulated carrier wave is amplified by a preamplifier 20 and then demodulated by a suitable demodulator 21, which may be of the conventional ring type or any other type capable of rectifying and filtering the voltage to produce a direct current output proportional to target mesh current, note FIG. 3. The demodulated current is fed to an isolation stage 22 (which in practice consists of an emitter-follower transistor hookup of more or less conventional type), and thence by conductor 23 to junction 24, from which it is supplied by way of conductor 25 to an electronic chopper 26 having an output driver stage 27, and by way of conductors 28, 28′ and 28″ to positive and negative error selectors 29 and 30, to be described.

The adjustment indicated as "Reference Adjustment No. 1" is important in that it provides a convenient means for causing system null to occur when operation is at the presaturation point of the curve of FIG. 1, as will be subsequently rendered apparent.

*Iris drive*

Figure 3:
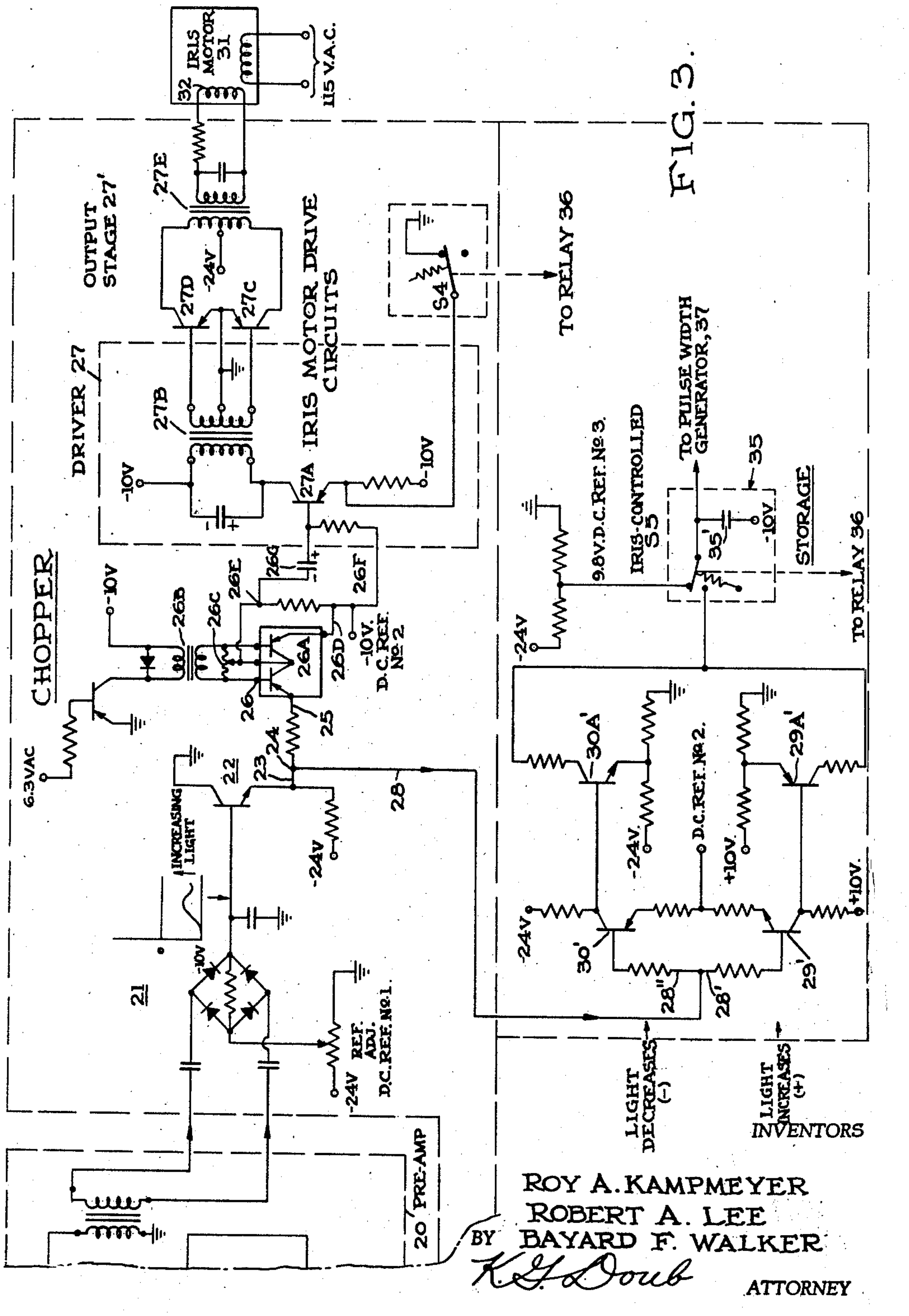

The motor for driving the iris diaphragm 13 is indicated in block diagram at 31, its control winding at 32 and its field winding at 33; it is preferably of the 60 cycle A.C. type and hence the chopper rate is 60 cycles per second. Referring to FIG. 3, the chopper comprises a multivibrator switch 26A, made up of a pair of transistors hooked up in flip-flop relation to a transformer 26B, across a balancing potentiometer 26C. One of the multivibrator transistors is connected to the output of the isolation stage 22, which is an amplified D.C. component proportional to target mesh current, while the other transistor is connected to a D.C. reference potential by way of conductor 26D. This reference voltage should be of a value to meet power requirements. The multivibrator is triggered by the 60 cycle input and compares the output of the demodulator 21 to the fixed reference voltage. By properly adjusting the potentiometer 26C, the reference voltage when at null will be of the same potential as the demodulator output; and the difference between these potentials is herein termed the "error signal." The junction 26E could be considered the pivot point of a mechanical switch arm which alternately contacts junctions 24 and 26F, charging capacitor 26G to a signal voltage level, which when at a given value predicated on the best operating region from an illumination standpoint, is at null (neither a plus or minus error voltage) causing the iris motor to remain inactive and the iris opening to remain fixed. Should the signal voltage rise above or fall below null, an error signal will result, causing the iris motor to drive the iris diaphragm in a direction to decrease or increase the said opening, depending upon whether the signal is in a plus or minus direction. As here shown, the error signal is amplified by an output driver 27, comprising an amplifying transistor 27A connected in common-emitter configuration with its emitter grounded across a switch S4, controlled by an iris limit circuit in a manner and for a purpose to be described. The collector of the transistor 27A is connected in circuit with the primary of an amplifying transformer 27B, the secondary of which has its center tap grounded and its end terminals connected to a pair of output stage transistors 27C and 27D, which in turn are connected in push-pull relation across the primary of an output transformer 27E, the secondary of which is connected to the control winding 32 of the iris motor 31.

*Error selector and storage circuits*

As heretofore noted, the illumination control system as herein disclosed is capable of utilizing automatically, by switching in and out as a function of the degree of illumination, an iris diaphragm, photocathode pulsing and light filtering, or any one of these three types of controls. Photocathode pulsing is utilized herein as a "vernier" control which is switched in when the iris aperture has been reduced to an optimum minimum consistent with proper functioning of the optical system (any further reduction would deleteriously affect picture resolution), and switched out when the iris opening opens wider than minimum in response to a decrease in photocathode illumination. Since the photocathode pulsing control must operate as a function of photocathode illumination, a pulse width generator is provided for applying a pulse to the photocathode of, for example, −450 volts, which varies in width as the log of the amplitude of the direct current input to the generator. This direct current voltage is obtained from a so-called storage device shown in block diagram at 35 and in FIG. 3 in the form of a capacitor 35′, which accumulates error voltages derived from the plus and minus error selectors 29 and 30. Since the error signals are nulled out by the closed loop iris servo-motor drive system, it becomes necessary to store these signals in order to have available a variable control voltage proportional to the average level of these signals. In the present instance, the error signals are separated into positive and negative channels by error selectors indicated in block diagram at 29 and 30 in FIG. 2 and which take the form of a pair of transistors indicated at 29′ and 30′ in FIG. 3, having their base electrodes connected to the output of the demodulator 21 by conductors 28 and 28′, 28″. These transistors have their emitters connected to D.C. reference No. 2 and their collectors supplied with a biasing voltage in a manner such that when the modulator output rises above the reference voltage, the transistor 29′ will conduct, and when it drops below the reference voltage, the transistor 30′ will conduct. The storage drivers shown in block diagram at 29′ and 30′ in FIG. 2 take the form of transistors 29A′ and 30A′ in FIG. 3; they function primarily as switches for charging capacitor 35′ when switch S5 is closed by an iris limit control solenoid in a manner to be described. It will be seen that the error selectors 29 and 30 operate to compare the output of the demodulator 21 to a fixed D.C. reference voltage, which is of the same potential as the demodulator output at system null, and charge the capacitor with a voltage proportional to and varying with target mesh current.

*Pulse width generator and control circuitry for photocathode pulsing*

Figure 5:
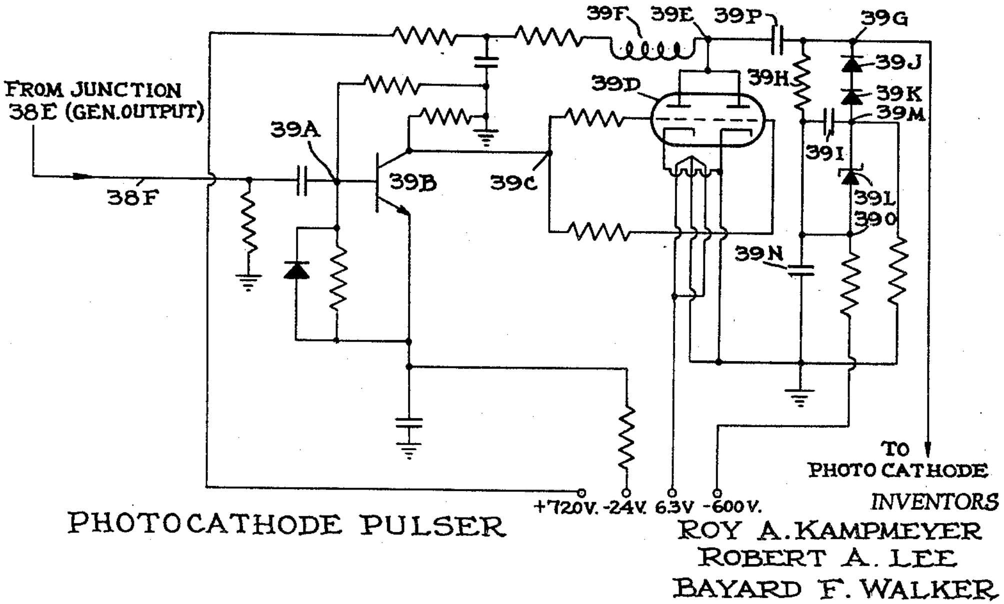
Figure 6:
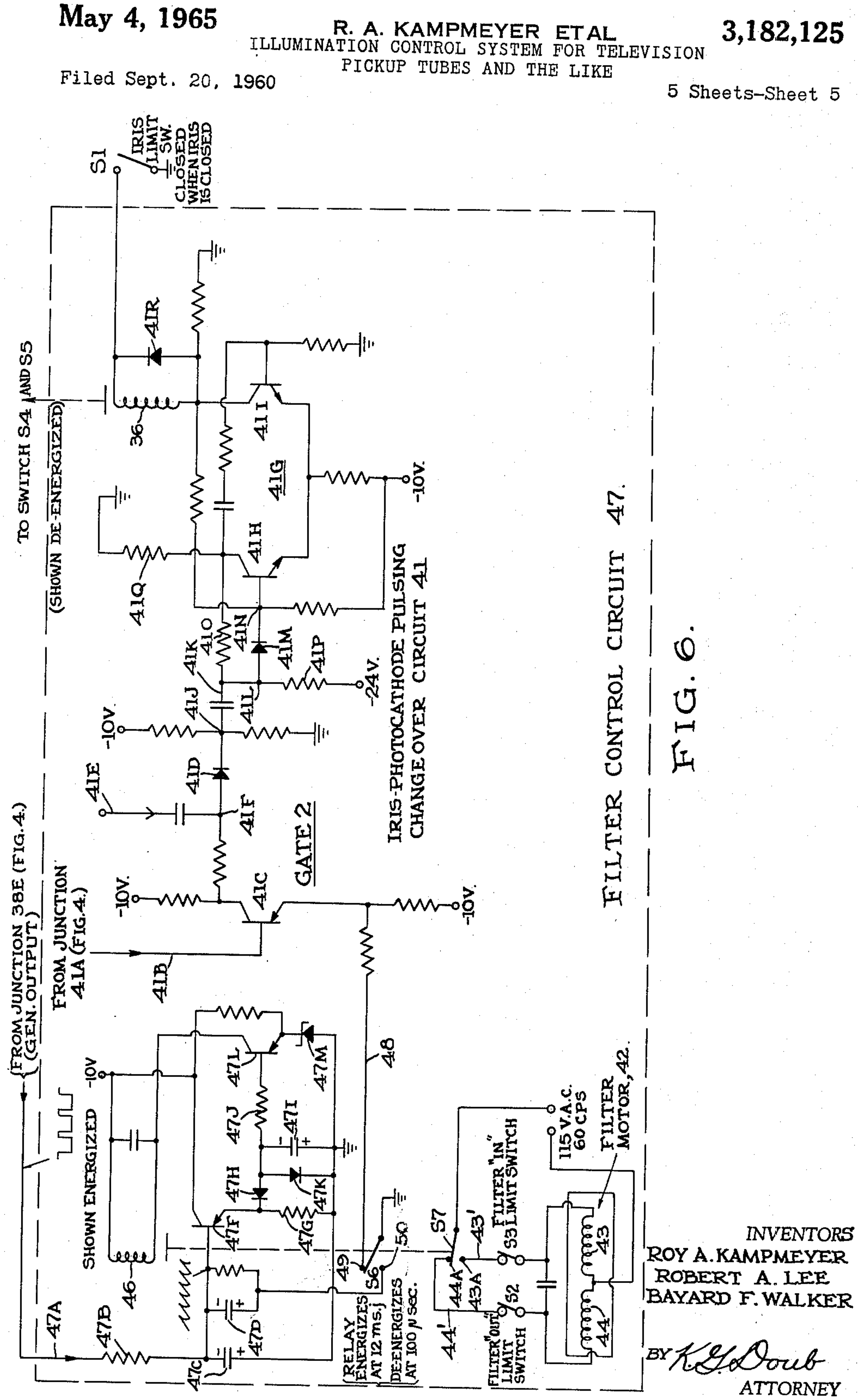

The iris diaphragm 13 is mechanically connected to a photocathode pulsing control switch, here designated S1, in a manner such that when the iris closes to "minimum," the said switch is closed. When this happens, relay solenoid 36 in the iris-photocathode pulsing changeover circuit becomes energized and opens switch S4, stopping the iris motor drive, and at the same time it closes switch S5 and connects the error selector and storage driver circuit with storage capacitor 35′, whereupon the "photocathode pulsing" circuitry operates to electrically vary the time that the normal supply voltage (for example −45 volts) is impressed on the photocathode at field rate. Under this method of control, there is not attenuation of the light admitted to the photocathode, but an equivalent effect is obtained by reducing the charge on the target. Thus by intermittently changing the photocathode potential from the normal −450 volts to a positive voltage, no additional electrons will arrive at the target from the photocathode during this period, thereby stopping the charging action even though the illumination level remains high. To carry out such a method effectively, the pulsing action must be a function of photocathode illumination; it must vary with variations in such illumination. In the system herein disclosed, the width of the pulse (normal photocathode potential) is varied with variations in target mesh current and hence with variations in photocathode illumination. The pulse control circuitry comprises a pulse width generator 37 having an output stage 38 (FIG. 4), a photocathode pulser 39 (FIG. 5), and a maximum-width detector 40 (also in FIG. 4); and coacting therewith are gating diodes which are designated as gates 1, 1A and 2 (FIGS. 4 and 6) and an iris-photocathode pulser changeover circuit 41 (FIG. 6).

Figure 4A:
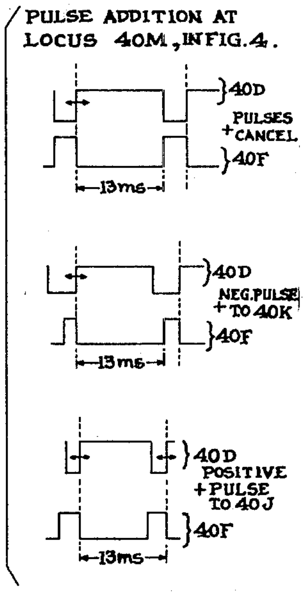
FIGS. 3 to 6, inclusive, are circuit diagrams of certain of the components shown in block diagram in FIG. 2.
Figure 4:
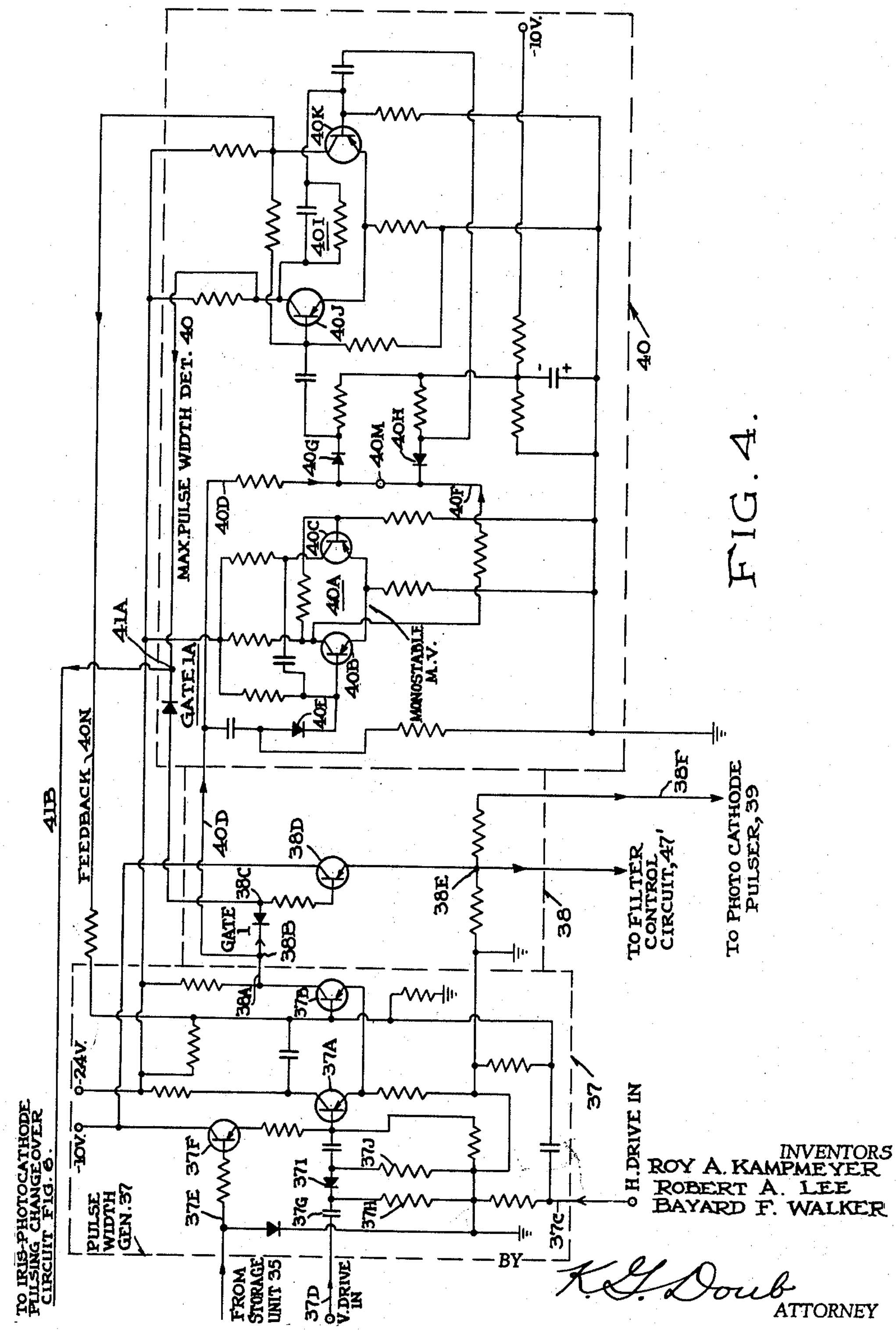

Referring to FIG. 4, the pulse width generator 37 comprises a one-shot or monostable vibrator made up of a pair of cross-coupled transistors 37A and 37B and conventional associated circuitry. Horizontal and vertical drive pulses are fed to the multivibrator by way of conductors 37C and 37D to synchronize the trailing and leading edges, respectively, of the output pulses, while the time base or width of each pulse is determined by the D.C. input from storage capacitor 35' by way of conductor 37E and transistor 37F, hooked up in emitter-follower configuration to feed the bias voltage to the transistor 37A. Capacitor 37G and resistor 37H constitute a differentiating network, while diode 37I and resistor 37J provide a clipper network for the vertical drive pulses. In operation, the multivibrator will deliver a pulse which has a width determined by the amount of D.C. input from storage capacitor 35'. but since this input has impressed thereon an A.C. component consisting of a multitude of vertical drive spikes, the point of cut-on will always be at the occurrence of a vertical spike. The horizontal drive pulses are applied to the base of transistor 37B and serve to turn this transistor on at the termination of the multivibrator pulse. In a practical installation, the generator was so designed that with a three volt D.C. input bias, the output pulse has a width of 100 microseconds, and at a nine volt input, the output pulse had a width of 13 milliseconds.

The output generated by multivibrator or pulse width generator 37 is a pulsating direct current component; it is taken off by way of conductor 38A, junction 38B, gate 1 which is closed during photocathode pulsing and is controlled in a manner to be described, junction 38C to output transistor 38D, which is hooked up in emitter-follower configuration, thence by way of junction 38E and conductor 38F to the input junction 39A of the photocathode pulser circuit 39. This pulser, in the form herein shown, comprises a driver transistor 39B, which delivers the amplified signal by way of collector lead to junction 39C and thence to the control grids of a dual triode output amplifier tube 39D.

In light control by electrical or photocathode pulsing, it is preferred that the potential on the photocathode either be at its normal value of say −450 volts, the "on" time, or above zero potential, the "off" time; and the shaping and integrating network shown in the output circuit of the dual triode 39D is designed to produce a pulse which will accomplish this function, with steep rise times at its leading and trailing edges. It is of no particular concern whether the upper level of the pulse is slightly above zero since cut-off is reached at zero. The output pulse at junction 39E is subjected to the action of a peaking coil 39F, to obtain a steep rise time.

When the input pulse at junction 39A is negative, transistor 39B is cut off and junction 39C goes to zero potential. This causes tube 39D to conduct. Junction 39G quickly changes potential to that of junction 39M, for example −450 volts, due to the fact that diodes 39J and 39K are biased on by the pulse. When the input pulse at junction 39A goes positive, transistor 39B conducts and junction 39C is driven negative. This action cuts off tube 39D. Junction 39G now goes to some positive voltage since diodes 39J and 39K are non-conducting. The +720 volt potential is of a magnitude such as will produce a high amplitude pulse at the plate of tube 39D, and also produce a shorter rise time on the waveform. The network consisting of resistor 39H and Zener diode 39L serves to decrease the recovery time after photocathode pulsing is discontinued. The capacitor at 39N is the conventional voltage stabilizer.

The function of the so-called maximum pulse width detector indicated at 40 in the block diagram of FIG. 2 and the electrical diagram of FIG. 4 is to initiate cycling back to control by the iris diaphragm alone should photocathode illumination decrease to a point where such control is feasible at minimum diaphragm opening.

Since the transistor 37A of the pulse width generator or multivibrator 37 is being continuously triggered on and off by vertical and horizontal drive pulses, the said generator operates continuously, and as long as the diode of gate 1 is conducting (gate closed) a pulsating direct current voltage is impressed on the photocathode pulser 39. Also, as long as gate 1 is closed, a monostable or one-shot multivibrator 40A, made up of cross-coupled transistors 40B and 40C, is being triggered by the output of multivibrator 37 by way of junction 38B, conductor 40D and diode 40E. Each time the multivibrator 40A conducts, it produces a negative pulse of, say 13 milliseconds in width, at locus 40M by way of conductor 40F, and pulse width generator 37 produces a positive pulse of variable width at 40M by way of conductor 40D. When the generator output pulse width is 13 milliseconds, both signals cancel at 40M. If the generator output pulse width slightly exceeds 13 milliseconds, a negative pulse is formed at 40M, and if the pulse width is slightly less than 13 milliseconds, a positive pulse is formed, see waveforms in FIG. 4A. The resultant pulses are channeled off by diodes 40G (positive) and 40H (negative). The circuit potentials are set up such that if the generator pulse width exceeds 13 milliseconds, the resultant negative pulse 40M is applied to transistor 40K, causing it to saturate and transistor 40J to cut off. This turns on gate 1A (renders it conducting) and turns off gate 1 (renders it non-conducting), which removes the pulse width generator output at junction 38E and replaces it with a D.C. voltage derived from transistor 40J, whereupon conductor 38F has impressed thereon a D.C. voltage. If the pulse width of generator 37 is less than 13 milliseconds, a positive-going pulse at junction 40M is applied to transistor 40J. The negative transition of the positive pulse turns on the transistor 40J, which causes transistor 40K to cut off. This opens gate 1A and closes gate 1. Pulses from generator 37 now pass through to the photocathode pulser 39. Conductor 40N provides feedback to generator 37, to reduce hysteresis. The bistable multivibrator 40I stays in the same position even though successive pulses are applied to the base of that transistor which has just been turned on.

*Iris-photocathode pulsing changeover circuit*

As heretofore noted, when the iris diaphragm closes down to "minimum" opening and photocathode pulsing starts, switch 1 is closed due to its mechanical connection with the diaphragm, energizing relay solenoid 36, whereupon switch 4 is opened, deenergizing the iris motor drive circuit, and switch 5 is closed, connecting the storage drivers with the storage capacitor 35'. Should the illumination on the photocathode increase during the pulsing mode, the pulses put out by the pulse width generator 37 will become narrower, and if the illumination decreases, the pulse width will widen until at, say, 13 milliseconds, photocathode pulsing ceases and the iris diaphragm again takes over. In order for this to happen, the solenoid 36 (FIG. 6) must be deenergized, permitting switch 4 to close and switch 5 to open. Deenergization of solenoid 36 for cycling back to iris diaphragm operation is under the control of an iris-photocathode changeover circuit 41; it includes an input switching transistor 41C, having its base connected to junction 41A by conductor 41B. When the bistable multivibrator 40I of the maximum pulse width detector 40 conducts in response to widening of the input pulse to 13 milliseconds, the transistor 41C is biased on. A diode 41D is connected into the collector circuit of the transistor 41C and this diode and its associated circuitry may be considered as gate 2. Vertical drive pulses are being continually applied to diode 41D by way of conductor 41E and junction 41F. A monostable or one-shot vibrator 41G, made up of cross-coupled transistors 41H and 41I, is provided and the solenoid 36 is connected into the collector circuit of transistor 41I. When the diode 41D conducts, a biasing pulse is applied to the base of transistor 41H by way of junction 41J, conductor 41K, junction 41L, diode 41M and junction 41N. The multivibrator now swings in a direction to bias 41H on and 41I off, and since collector current then no longer flows in the output circuit of 41I, solenoid 36 will be deenergized. Up until this time, however, 41I had been biased on and 41H off due to closing of iris limit switch S1. Diode 41M opens when transistor 41H conducts, thus preventing spurious operation of monostable multivibrator 41G. The operating time of the generator 41G, if allowed to oscillate, is, for example, one-half second. Conductor 48 disables transistor 41C when the filter 12 is in, as will be more fully hereinafter discussed. Resistors 41O and 41P in conjunction with 41Q provide a voltage divider for setting the potential at diode 41M. Diode 41R functions to prevent transients from flowing in the collector circuit of transistor 41I and damaging it.

*Filter motor drive and control circuitry*

As heretofore noted, there may be times when the scenic illumination is so bright as to require a filter in front of the optical system in addition to the iris and photocathode pulsing modes. For example, such additional light attenuation may be required when a television camera looks directly or almost directly into the sun or other brightly illuminated scene. At this time filter 12 is moved into filtering position. In the particular installation shown, the filter is either in filtering position or completely out, although it could be a variable-density filtering operation, if so desired. A filter motor is indicated at 42; it is shown as having a pair of control windings 43 and 44, connected to a 115 volt A.C. supply by way of conductors 43′ and 44′ having limit switches S2 and S3 therein. These switches may be mechanically connected to the filter for actuation thereby, or they may be of the motor-actuated or any other suitable type. In the present instance, the winding 43 is energized to drive the motor in a direction to move the filter 12 into filtering position and the winding 44 is energized to drive the motor in a filter-out direction. When the filter reaches its "in" position, it opens switch S3 and when the filter is in its "out" position, it opens switch S2. S2 and S3 close when the filter moves away from its extreme in or out position.

As heretofore indicated, when the photocathode pulsing system is in operation, the output of the pulse width generator 37 is a pulsating direct current component in which the pulse width decreases upon an increase in scenic illumination (increase in target mesh current) and increases upon a decrease in scenic illumination (decrease in target mesh current); and the average voltage level of this component varies with variations in scenic illumination. Should the pulse width decrease to a given or predetermined value, a switch marked S7 is closed against contact 43A, the filter-in position, and should the pulse width widen to, say 13 milliseconds, the switch S7 is moved into engagement with contact 44A, the filter-out position. The switch S7 is controlled by a relay 46, the solenoid of which is energized and deenergized by the filter control circuitry shown in block diagram at 47 and in detail in FIG. 6. Referring to FIG. 6, the input to the filter control circuit is by way of conductor 47A from junction 38E, on which the pulsating direct current output from the pulse width generator is impressed. The negative-going pulses at this juncture are essentially of square configuration which are integrated into a sawtooth waveform by the resistor-capacitor combination of 47B–47C and 47B–47D. The transistor 47F is an emitter-follower which functions primarily as an insolator; it has a load resistor 47G in its emitter lead and the resultant pulses are again integrated by the forward resistance of diode 47H in conjunction with capacitor 47I and the forward base-to-emitter resistance of transistor 47F. The resistor at 47J limits the base current and the diode at 47K clamps the integrator output voltage to ground. The transistor 47L amplifies the output, and the solenoid 46 is connected into its collector circuit. Zener diode 47M sets the bias for the emitter of 47L. The primary function of diode 47H is to remove the input signal if sufficient charge is built up on capacitor 47I (if the charge is equal to the pulse amplitude at 47G). The capacitor 47I will then discharge until the pulse amplitude is sufficient to make diode 47H again conduct.

Should the scenic illumination attain such intensity as to cause the pulse at junction 38E to narrow to some predetermined value, capacitor 47I will discharge at a variable rate between the bias limits of turn-on and turn-off of transistor 47L. Since the voltage level of the pulsating output from the pulse width generator varies in proportion to scenic illumination, should the charge on the capacitor reach the cut-off point of transistor 47L, the solenoid 46 in the collector circuit of the transistor 47L will be deenergized, and switch S7 will be moved out of engagement with contact 44A (filter-out position) and into engagement with contact 43A (filter-in position). Should the pulse width widen to some predetermined value, say 12 milliseconds, the solenoid 46 will become energized, thereby moving switch S7 free of contact 43A into engagement with contact 44A, the filter-out position.

The switch indicated at S6 is a safety device; it ensures that the iris-photocathode changeover circuit will be prevented from shifting to the iris mode should the pulse width go to 13 milliseconds when the filter 12 is moving out. As heretofore noted, the filter should come out at a pulse width of 12 milliseconds in order to prevent mode oscillation. The emitter of the transistor 41C of the iris-photocathode changeover circuit has its supply lead connected to ground by way of conductor 48 and switch contact 49, so that when the switch S6 is in engagement with said contact, the iris-photocathode changeover circuit is rendered operative. When the switch S6 is moved free of contact 49 against contact 50, it disconnects the ground from the emitter circuit of transistor 41C, and said transistor is rendered inoperative, preventing the system from going back to iris mode.

The reason for utilizing the two integrators at 47B–C and 47B–D is to obtain greater resolution at the 100 microsecond limit. The 47B–47C integrator has a short time constant, and its output changes in large proportions for input pulse width changes. This is not true for the 47B–47D integrator. The same pulse width that produces a useable output from the small integrator produces very little output when the large integrator is switched in. The following is an attempt to set forth the advantage of this arrangement: Assume the system is in the photocathode pulsing mode, relay 46 would be energized and integrator 47B–47D out. Now, as the pulse width narrows, the peak-to-peak output of integrator 47B–47C drops. At 100 microseconds, the integrated output voltage is so small that relay 46 deenergizes, causing the filter 12 to move to filtering position. Integrator 47B–47D also comes in on top of the first integrator and overwhelms it (it is in shunt therewith). The peak-to-peak output signal of the total integrator is even smaller now, but this only reinforces the situation. If the input pulse gets wider and increases to 12 milliseconds, at this width the integrated signal is sufficient to switch on transistor 47L, and the filter 12 comes out. Integrator 47B–47D is now switched out (its job is finished). Hence the function of the integrators 47B–47C is to produce resolution at 100 microseconds, and that of 47B–47D is to keep peak-to-peak integrated output voltage below a safe level so that at 13 milliseconds the level has built up enough to trigger the transistor. To achieve this, the time constant of 47B–47D is made relatively large.

*Operation*

The purpose of the conventional light control system for a television pickup tube is to maintain the light level at the photocathode nearly constant at an intensity which will result in the clearest image at the viewer or kinescope. In the herein disclosed system, three methods of control are available, namely, by varying the effective opening of an iris diaphragm, by photocathode pulsing, and by light filtering or polarization. The latter becomes imperative should the scenic illumination become so intense as to endanger the photocathode of the orthicon. A source of control potential is utilized which is inherent in the operation of the pickup tube, and in a manner such as to be independent of the video output signal. Current in the order of, for example, 50 millimicroamps is taken directly from the target mesh 15 to the modulator 16, where it modulates a carrier of, for example, 6 kc. produced by the divider stage 18, driven from the horizontal input generator, not shown but which forms part of any television transmitter system. This carrier wave is amplified at 20 and then demodulated at 21. The light control system as herein disclosed was originally designed for use in a closed-circuit television system, but obviously is capable of use in an open or radio frequency carrier system.

*Control by iris diaphragm.*—As a starting point in the description of operation, it will be assumed that the scenic illumination is such as to permit adequate light control within the range of the iris diaphragm 13. At this time the filter 12 is out and the photocathode is subjected to a steady D.C. potential of a value for which it may have been designed, for example −450 volts. The circuit conditions which cause this are:

(*a*) The iris-controlled limit switch No. 1 is open.

(*b*) The photocathode changeover circuit 41 is held inactive since the solenoid 36 is deenergized due to opening of switch 1.

(*c*) The pulse width generator is stable at a maximum pulse width of 13 milliseconds; it has opened gate 1 which supplies a D.C. signal to the input of the photocathode pulser 39.

(*d*) Gate 2 in the photocathode changeover circuit 41 is closed; and switch S6 has been closed, as a result of deenergization of solenoid 46, which permits operation of gate 2.

(*e*) Limit switch S2 is open as a result of the filter 12 being out.

(*f*) Switch S4 is closed due to deenergization of solenoid 36, and switch S5 is on D.C. reference No. 3, keeping pulse width generator 37 at a constant wide width.

Figure 1:
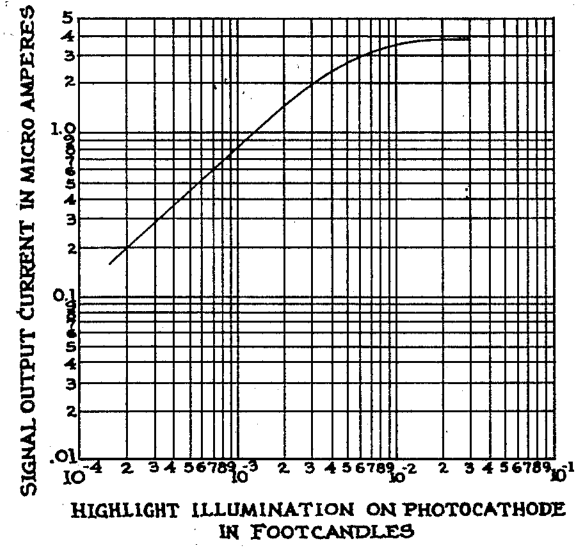
FIG. 1 is a curve chart, plotting photocathode illumination in foot candles against signal output current in microamperes, in the operation of an Image Orthicon type of pickup or camera tube.

(*g*) The reference-adjust control No. 1 at the demodulator 21 has been adjusted to a point where the picture at the picture tube or viewer indicates that the system null of the iris motor drive circuit occurs when operation is at the knee or presaturation point of the curve of FIG. 1.

Changes in scenic illumination produce a proportional change in target mesh current and such changes result in an "error" voltage due to the action of the chopper 26, which compares the output of demodulator 21 to fixed reference voltage No. 2, here indicated as −10 volts; and when the system is at null, the reference voltage is of the same potential as the demodulator output. The difference between these voltages when at times other than null is considered the A.C. error signal, and this error is amplified and operates the control winding 32 of the iris drive motor. Should the signal voltage rise above or fall below null, the resultant error signal will cause the iris motor to drive the iris diaphragm in a direction to decrease or increase the iris opening depending upon whether the signal is in a plus or minus direction. An increase in scenic illumination results in an increase in target mesh current, and this causes the iris motor to drive the iris in a closing direction; a decrease in scenic illumination having the opposite effect. This error can change phase similar to most servo systems and the result is that the iris motor is driven in a direction depending upon the error phase until the light level on the photocathode is brought back to its set operating level. The output of the demodulator 21 becomes increasingly positive with increasing scenic illumination, and the amount of this output when added to the D.C. reference No. 1 is adjusted so that its magnitude is equal to that of D.C. reference No. 2. Since the loop is always null at this potential, adjusting the demodulator reference control causes loop action and enables the light on the image orthicon photocathode to be set to any desired level.

*Photocathode pulsing.*—Should the scenic illumination increase to a point where the iris diaphragm closes to "minimum" opening (any further reduction would cause interference with the optical system), limit switch S1 is closed. When this happens, solenoid 36 in the iris-photocathode changeover circuit becomes energized and opens with S4. This stops the iris motor drive at "iris minimum." At the same time, the solenoid 36 effects closure of the switch S5, and this connects the plus and minus error selector and storage drive circuits 29–30′ with the storage capacitor 35′. Should there now be a further increase in scenic illumination, the output of demodulator 21 would go more positive than D.C. reference No. 2 and the error selector 29 would conduct and through its storage driver 29′ place an increasing positive charge on the storage unit 35′. This causes the pulse width generator (which operates continuously due to horizontal and vertical drive pulses) to put out a narrower pulse, and when this pulse narrows to a given width, here 13 milliseconds, the maximum pulse width detector 40 closes gate 1 and the photocathode potential is pulsed, i.e., it is intermittently increased from its normal steady value to zero or slightly positive, which is equivalent to reducing the light on the photocathode.

Should the output of the demodulator 21 go in the opposite direction (become less positive due to a decrease in scenic illumination) the pulse width will widen; and should it widen to or beyond 13 milliseconds, the pulse width detector 40 will open gate 1, limit switch No. 1 will open, solenoid 36 will be deenergized, switch 4 will close and switch 5 open, and control by the iris diaphragm will resume.

Photocathode pulsing does not attenuate the light admitted to the photocathode, but an electrical effect equivalent to light attenuation is obtained by varying the charge on the target in proporion to variations in scenic illumination. In other words, by intermittently changing the potential of the photocathode from its normal −450 volts to a positive potential, the charging action on the target will be momentarily stopped even though the illumination level remains high.

*Switching filter 12 "in" and "out".*—Should the scenic illumination increase to a point where damage to the pickup tube may possibly result, the neutral density filter 12 is moved to its "in" position. The output of the pulse width generator is a pulsating direct current potential in which the pulse width narrows upon an increase in illumination and widens upon a decrease in illumination, and the average level of this output also varies with changes in illumination. The filter control circuit 47 integrates and filters these pulses and comes out with a D.C. component which deenergizes solenoid 46 when the pulse narrows to a predetermined width and energizes said solenoid when the pulse widens to a predetermined width, here 13 milliseconds. When the solenoid 46 is deenergized, the switch S7 closes against contact 43A and the filter motor is driven in a direction to move the filter into filtering position; and when the solenoid is energized, the said switch S7 is moved against contact 44A and the filter motor is driven in a direction to move the filter out of its filtering position. In the position of the parts as shown in the drawings, the filter is out and the iris-photocathode changeover circuit is operative at the command of the pulse width generator to cause the system to operate solely on the iris diaphragm mode or on the pulsing mode in conjunction with the iris diaphragm, depending upon the degree of scenic illumination.

From the foregoing it will be apparent that the herein-disclosed system coordinates the operation of three types of light controls, two of which are, per se, mechanical and the other electrical, each of which fulfills its function to obtain a wide range of control without causing deterioration of picture resolution. By performing obvious manual switching functions, and in certain instances minor changes in circuitry, any one or two of these controls may be utilized without the other.

What is claimed is:

1. In a television system utilizing a signal pickup tube of the return scanning beam type having a photocathode onto which the optical image of the scene being televised is projected and a scanning target on which an electrical charge image is formed in proportion to the intensity of photocathode illumination by photoelectrons emitted from said photocathode, said tube also having video signal output means energized by the electrons in said return beam; electrically-operated means for controlling the intensity of light admitted to said photocathode including a reversible servo motor, a null type electrical circuit for energizing said servo motor, means for sensing independently of the video output signal a current which varies with variations in the charge on said target, a modulating device and means producing an alternating current carrier signal connected to said modulating device, means for applying the sensed current to control said modulating device to produce an output signal which varies in magnitude from a selected system null reference potential with variations in photocathode illuminaiton, and means for applying said last-named output signal to said circuit to control said servo motor.

2. A system as claimed in claim 1 wherein the pickup tube is provided with a target mesh electrode for collecting secondary electrons emitted from the target and the current flowing in said target mesh is sensed to obtain the source of control potential.

3. In a television system utilizing a signal pickup tube of the return scanning beam type having a photocathode onto which the optical image of the scene being televised is projected and a scanning target on which an electrical charge image is formed in proportion to the intensity of photocathode illumination by photoelectrons emitted from said photocathode, said tube also having video signal output means energized by the electrons in said return beam; electrically-operated means for controlling the intensity of light admitted to said photocathode including a null type reversible alternating current servo motor having a control winding, means for sensing an electrical current independently of the video output signal which varies with variations in photocathode illumination, a modulating device and amplifying means and means producing an alternating current carrier signal connected to said modulating device, means for applying the sensed current to control said modulating and amplifying means to produce an amplified modulator signal, demodulating means connected to receive said amplified modulated signal including means producing a direct current reference potential which is compared with the demodulated signal to produce an output which varies in magnitude from said reference potential with variaitons in photocathode illumination, means for converting the demodulated direct current output into an alternating current, said converting means operating to compare the demodulated output with a reference potential and produce an error signal proportional to the differential therebetween, and means for amplifying the error signal and applying it to said control winding of the servo motor to drive the latter in a null direction.

4. A system as claimed in claim 3 wherein said means for controlling the light intensity comprises an apertured iris diaphragm which is driven in an aperture-closing direction by said servo motor as photocathode illumination increases beyond a given operaitonal value, and means are provided for stopping the drive on the diaphragm when the iris aperture closes to a preselected minimum.

5. In a television system utilizing a signal pickup tube having a photocathode onto which the optical image of the scene being televised is projected and a scanning target on which an electrical charge image is formed in proportion to the intensity of photocathode illumination, means for reducing the intensity of illumination of said photocathode when the scenic illumination is such as to illuminate the photocathode above a selected operational value, including: a first light control means effecitve over a limited illumination range, a second light control means operative in conjunction with said first light control means to extend the overall range of light control, a third light control means operative in conjunction with said first and second light control means to further extend the range of light control, electrical means for controlling said light control means, means for producing a potential which varies with variations in photocathode illumination, means for applying said potential as a primary source of control for said electrical means, and means for rendering said second and third light control means successively operative or inoperative in response to changes in photocathode illumination at successively higher levels of illumination.

6. A system as claimed in claim 5 wherein said first light control means comprises an apertured iris diaphragm which is driven in an aperture-closing or opening direction by said electrical means upon an increase or decrease in photocathode illumination at illumination levels beyond a given operational value, said second light control means comprises means for intermittently biasing the photocathode potential from its normal value in a direction to reduce the charge on the target, said third light control means comprises a filter movable into and from filtering position, and means are provided for stopping the drive on the iris diaphragm when its aperture is closed to an optimum minimum and to thereafter render said photocathode pulsing system operative or inoperative and to move said filter into or out of filtering position successively in response to changes in photocathode illumination during operation in stepped levels of illumination beyond that which caused the iris aperture to close to optimum minimum.

7. In a television system utilizing a signal pickup tube having a photocathode onto which the optical image being televised is projected, means for reducing the intensity of illumination of said photocathode when the scenic illumination is such as to cause illumination of the photocathode above a selected operational or safe value, including: means for sensing a current which varies with variations in the illumination of said photocathode, signal modulating and amplifying means controlled by said current to provide a modulated output signal which varies with respect to a selected system reference potential with variations in photocathode illumination, an iris diaphragm having a variable light aperture, a reversible alternating current servo motor for driving said iris in either an aperture-closing or opening direction, said motor having a reversing control winding, means for converting the demodulated output signal to a frequency compatible with that required to drive said servo motor, said latter means operating to compare the demodulated output with a null reference voltage to provide an error signal proportional to the differential therebetween, means for amplifying the error signal and applying the amplified output to said control winding to drive the servo motor in an aperture opening or aperture closing direction, and a limit switch arranged to deenergize the motor drive circuit when the iris aperture closes to a selected optimum minimum.

8. In a television system utilizing a signal pickup tube having a photocathode onto which the optical image being televised is projected, means for reducing the intensity of illumination of said photocathode when the scenic illumination is such as to cause illumination of the photocathode above a selected operational or safe value, including: means for sensing an electrical current which varies with variations in photocathode illumination, signal modulating and amplifying means controlled by said current to provide a modulated output signal which varies with respect to a selected reference system potential with variations in photocathode illumination, an iris diaphragm having a variable light aperture, a reversible alternating current servo motor for driving said iris in either an aperture-closing or opening direction, said motor having a reversing control winding, means for converting the demodulated output signal to a frequency compatible with that required to drive said servo motor, said latter means operating to compare the demodulated output with a system null reference voltage to provide an error signal proportional to the differential therebetween, means for amplifying the error signal and applying the amplified output to said control winding to drive the servo motor in an aperture-opening or aperture-closing direction, a limit switch arranged to deenergize the motor drive circuit when the iris aperture closes to an optimum minimum selected on the basis of picture quality, a light filter driveable to and from filtering position with respect to the photocathode to further extend the range of light control at high levels of illumination, a reversible motor for driving said filter, and means rendered operative upon deenergization of said motor drive circuit for controlling said filter motor as a function of photocathode illumination.

9. A system as claimed in claim 8 wherein the means for controlling said filter motor comprises a pulse width generator having a pulse width control circuit responsive to changes in photocathode illumination, and the filter motor is of the reversing type having a control winding and an associated control circuit which is responsive to variations in pulse width.

10. In a television system utilizing a signal pickup tube having a photocathode onto which the optical image being televised is projected, means for reducing the intensity of illumination of said photocathode when the scenic illumination is such as to cause illumination of the photocathode above a selected operational or safe value, including: means for sensing an electrical current which varies with variations in photocathode illumination, signal modulating and amplifying means controlled by said current to provide a modulated signal output which varies with respect to a selected system reference potential with variations in photocathode illumination, a pulse width generator, means responsive to changes in the level of said modulated output signal for controlling the width of said generator pulse, and a control circuit for said first-named means responsive to changes in pulse width connected to the output of said generator.

11. A system as claimed in claim 10 wherein said pulse width generator comprises a multivibrator to which horizontal and vertical scanning pulses are fed to synchronize the leading and trailing edges of the pulse produced by the generator and the means responsive to changes in the level of said modulated output signal comprises an error-selector network which compares the output signal to a direct current reference potential, and when the output signal rises above or falls below said potential, a storage device is charged either positively or negatively with respect to said reference potential and said device functions to feed a pulse-control voltage to the generator input which varies with variations in photocathode illumination.

12. A system as claimed in claim 10 wherein a pulse width detecting network is connected to the output of the pulse width generator and controls a gating device such as a gating diode interposed between the generator output and the photocathode illumination control circuit.

13. In a television system utilizing a signal pickup tube having a photocathode onto which the optical image being televised is projected and a scanning target on which an electrical charge image is formed in proportion to photocathode illumination by photoelectrons emitted from said photocathode, a photocathode supply circuit for impressing a normal steady operating potential on the photocathode, and means for reducing the intensity of illumination of said photocathode to within a selected operational range when the scenic illumination is such as to cause illumination of the photocathode above such range, including: means for sensing a current which varies with variations in photocathode illumination, signal modulating and amplifying means controlled by said current to provide a modulated output signal which varies with respect to a selected system reference potential with variations in photocathode illumination, an iris diaphragm having a variable light aperture, an electric servo motor and a null type circuit therefore effective to drive said iris in either an aperture-closing or opening direction back to circuit null point when said output signal rises above or falls below said reference potential, means operative to deenergize the motor drive circuit when the iris aperture closes to an optimum minimum selected on the basis of picture quality and to reenergize said circuit when the iris aperture opens beyond said minimum; photocathode pulsing means rendered operative and inoperative, respectively, by said deenergizing and reenergizing means for electrically varying the time that the normal photocathode supply voltage is impressed on the photocathode at field rate to further extend the range of light control at levels of illumination higher than the intensity which produces minimum closing of the iris diaphragm, said photocathode pulsing means including a pulse-generating network operative to produce a pulse the width of which varies with variations in photocathode illumination, and means responsive to variations in pulse width for impressing the output of said pulse-generating network on the photocathode supply circuit to intermittently vary the photocathode supply potential in a direction to decrease the charge on the target.

14. In a television system utilizing a signal pickup tube having a photocathode onto which the optical image being televised is projected and a scanning target on which an electrical charge image is formed in proportion to photocathode illumination by photoelectrons emitted from said photocathode, a photocathode supply circuit for impressing a normal steady operating potential on the photocathode, and means for reducing the intensity of illumination of said photocathode to within a selected operational range when the scenic illumination is such as to cause illumination of the photocathode above such range, including: means for sensing a current which varies with variations in photocathode illumination, signal modulating and amplifying means controlled by said current to provide a modulated output signal which varies with respect to a selected system reference potential with variations in photocathode illumination, an iris diaphragm having a variable light aperture, an electric servo motor and a null type circuit therefor effective to drive said iris in either an aperture-closing or opening direction back to circuit null point when said modulated output signal level rises above or falls below said reference potential and produces positive and negative error signals with respect to said reference potential; means operative to deenergize the motor drive circuit when the iris aperture closes to an optimum minimum selected on the basis of picture quality and to reenergize said circuit when the iris aperture opens beyond said minimum; photocathode pulsing means rendered operative and inoperative, respectively, by said deenergizing and reenergizing means for electrically varying the time that the normal photocathode supply voltage is impressed on the photocathode at field rate to further extend the range of light control at levels of illumination higher than that which produces minimum closing of the iris diaphragm; said photocathode pulsing means including a pulse generating network operative to produce a pulse the width of which varies with variations in photocathode illumination, a pulse width detecting network connected to the output of said pulse generating network for detecting the width of the generated pulse; and electronic gating means operative to connect the output of said pulse generating network to and disconnect it from said photocathode supply circuit, said gating means being controlled by said pulse width detecting network as a function of pulse width.

15. A system as claimed in claim 14 wherein the width of the pulse produced by said generator is controlled by an error-selecting network adapted to be connected to the input side of said generator and is effective to vary the generator control potential with variations in the level of photocathode illumination, and the means operative to deenergize the iris servo motor drive circuit is also operative to close a switch for connecting said error-selecting network to said generator.

16. A system as claimed in claim 14 wherein the width of the pulse produced by said generator is controlled by an error-selecting network which varies the control potential with variations in the intensity of photocathode illumination, and there is a switch which when closed on one of its contacts connects the output of said error-selecting network to the generator which switch is in turn controlled by a relay which responds in a switch-closing direction to deenergization of the iris motor drive circuit and in a switch-closing direction to deenergization of the iris motor drive circuit and in a switch-opening direction to energzation of an iris-to-photocathode pulsing changeover circuit which latter circuit is gated on by said pulse width detector when the generator pulse attains a given width.

17. A system as claimed in claim 14 wherein to further extend the range of light control and to protect the photocathode at extremely high levels of scenic illumination a light filter element is provided which is driven into and from filtering position by a reversible motor having reversing switch means controlled by a relay which in turn is controlled by a pulse-integrating and filtering network connected to the output of said pulse width generator.

18. A system as claimed in claim 14 wherein to further extend the range of light control and to protect the photocathode at extremely high levels of scenic illumination a light filter element is provided which is driven into and from filtering position by a reversible motor having reversing switch means controlled by a relay which in turn is controlled by a pulse-integrating and filtering network which is fed pulses from said pulse width generator, said integrating and filtering network deriving a signal which varies in amplitude with variations in pulse width and energizes the said relay when the pulses narrow to a given width and deenergizes said relay when the pulses widen to a given width.

19. In a television system utilizing a signal pickup tube having a photocathode onto which the optical image being televised is projected and a scanning target on which an electrical charge image is formed in proportion to photocathode illumination by photoelectrons emitted from said photocathode, a photocathode supply circuit for impressing a normal steady operating potential on the photocathode, and means for reducing the intensity of illumination of said photocathode to within a selected operational range when the scenic illumination is such as to cause illumination of the photocathode above such range, including: means for sensing a current which varies with variations in photocathode illumination, signal modulating and amplifying means controlled by said current to provide a modulated output signal which varies with respect to a selected system reference potential with variations in photocathode illumination, an iris diaphragm having a variable light aperture, an electric servo motor and a null type circuit therefor effective to drive said iris in either an aperture-closing or opening direction back to circuit null point when said modulated output signal level rises above or falls below said reference potential and produces positive and negative error signals with respect to said reference potential; photocathode pulsing means for electrically varying the time that the normal photocathode supply voltage is impressed on the photocathode at field rate to coact with said iris to extend the range of light control including an electronic pulse generator in the form of a multivibrator operative to produce a pulse the width of which varies with variations in its control potential, a storage device for supplying said control potential, means for charging said device with a voltage proportional to the sum total of the said positive and negative error signals, a generator potential control switch which when in a first position connects the generator to a steady fixed control potential and when in a second position connects the generator to said charging means by way of said storage device; a circuit connecting the output of said generator to said photocathode supply circuit having therein pulse shaping and integrating means for impressing a pulse on the normal photocathode supply potential which intermittently varies the latter in a direction to reduce the charge on the target; a first electronic gate in said generator output circuit, a maximum pulse width detector also connected to the output of said generator and provided with means for controlling said gate to maintain the latter closed or non-conducting when the generator output pulse is within a given width and to open or render said gate conducting when said output pulse exceeds said given width; an iris motor circuit control switch movable to circuit-deenergizing and reenergizing positions, a first relay which when energized is effective to produce movement of said iris motor control switch to circuit deenergizing position and said generator control switch to its second position; a first limit switch adapted to coact with said relay to permit energization thereof only when the iris aperture closes to an optimum minimum selected on the basis of picture quality; an iris-to-photocathode changeover network for controlling energization of said first relay as a function of pulse width including a monostable multivibrator having its input circuit provided with a second electronic gate which is opened or caused to conduct by said pulse width detector only when the generator output pulse is at a width to effect closure of the iris aperture to minimum, said second gate when conducting swinging said monostable multivibrator to relay-energizing position at which time said first limit switch is closed; a filter element adapted to still further extend the range of light control and protect the photocathode at dangerously high levels of scenic illumination, a reversible electric motor for moving said element into and from filtering position, a filter control circuit for effecting reversal of said latter motor including reversing switch means, a relay for controlling said reversing switch means, and a pulse integrating and filtering network for controlling energization of said relay connected to the output of said pulse generator beyond said first electronic gate, said latter network becoming effective to produce energization of said relay only during such time as the generator output pulse narrows to a predetermined width.

20. The method of attenuating the effect of high scenic illumination in a television system utilizing a television pickup tube having a photocathode and a target on which an electrical charge image is formed in proportion to photocathode illumination, which comprises generating a pulse which varies in width as a function of photocathode illumination, and impressing said pulse on the normal photocathode supply potential in a manner such as to intermittently vary the said supply potential in a direction to reduce the charge on the target.

21. In a television system utilizing a signal pickup tube having a photocathode onto which the optical image being televised is projected and a scanning target on which an electrical charge image is formed in proportion to photocathode illumination, a photocathode supply circuit for impressing a normal steady operating potential on the photocathode, means for generating a pulse having a width which varies with variations in photocathode illumination, and means for integrating and filtering said pulse and impressing the resultant potential on the photocathode supply potential to intermittently vary the latter in a direction to reduce the charge on the target.

22. In a television system utilizing a signal pickup tube having a photocathode onto which the optical image of the scene being televised is projected, means for reducing the intensity of illumination of said photocathode when the scenic illumination is such as to illuminate the photocathode above a selected value including: a first light control means effective over a limited illumination range comprising an apertured iris diaphragm and electronically actuated means for driving said iris diaphragm in an aperture closing direction as photocathode illumination increases beyond a given operational value, a second light control means operative in conjunction with said first light control means to extend the overall range of the light control, means for producing a potential which varies in response to variations in illumination of said photocathode, means for applying said potential as a primary source of control for said electrically actuated means, means for rendering said second light control means operative and inoperative as a function of photocathode illumination, and means for stopping the drive on the diaphragm when its aperture is closed to a preselected minimum and to thereupon render said second light control means operative to extend the range of light control.

References Cited by the Examiner

UNITED STATES PATENTS

| | | | |
|---|---|---|---|
| 2,431,824 | 12/47 | Poch | 178—7.2 |
| 2,898,536 | 8/59 | Musolf | 178—7.2 |
| 2,901,539 | 8/59 | Morgan | 178—7.2 |
| 2,978,537 | 4/61 | Kruse | 178—7.2 |

OTHER REFERENCES

German application G 17,647, November 8, 1956.

DAVID G. REDINBAUGH, *Primary Examiner.*

NEWTON N. LOVEWELL, ROY LAKE, *Examiners.*